(12) United States Patent
Shaffer et al.

(10) Patent No.: US 8,842,630 B2
(45) Date of Patent: Sep. 23, 2014

(54) EXTENDABLE FREQUENCY HOPPING TIMESLOTS IN WIRELESS NETWORKS

(75) Inventors: Shmuel Shaffer, Palo Alto, CA (US); Sandeep Jay Shetty, San Jose, CA (US); Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 431 days.

(21) Appl. No.: 12/971,205

(22) Filed: Dec. 17, 2010

(65) Prior Publication Data

US 2012/0155284 A1    Jun. 21, 2012

(51) Int. Cl.
| | |
|---|---|
| *H04W 4/00* | (2009.01) |
| *H04W 72/04* | (2009.01) |
| *H04W 84/18* | (2009.01) |
| *H04W 28/06* | (2009.01) |
| *H04W 72/00* | (2009.01) |
| *H04B 1/713* | (2011.01) |

(52) U.S. Cl.
CPC .......... *H04W 72/0446* (2013.01); *H04W 84/18* (2013.01); *H04W 28/06* (2013.01); *H04W 72/00* (2013.01); *H04B 1/713* (2013.01)
USPC ........................................................ 370/330

(58) Field of Classification Search
None
See application file for complete search history.

(56) References Cited

U.S. PATENT DOCUMENTS

| | | | |
|---|---|---|---|
| 1,869,659 A | 8/1932 | Broertjes | |
| 2,292,387 A | 8/1942 | Markey et al. | |
| 6,292,516 B1 | 9/2001 | Petsko et al. | |
| 6,760,308 B1 * | 7/2004 | Ghanma et al. | 370/235 |
| 7,436,767 B1 | 10/2008 | Wei | |
| 7,499,453 B2 | 3/2009 | Carlson et al. | |
| 7,551,578 B2 | 6/2009 | Pollack et al. | |
| 2008/0075145 A1 * | 3/2008 | Balachandran et al. | 375/132 |
| 2009/0161687 A1 * | 6/2009 | Yu et al. | 370/436 |

OTHER PUBLICATIONS

Thubert, "RPL Objective Function 0,", <draft-ietf-roll-of0-03>, Jul. 29, 2010 version.
Vasseur et al., "Routing Metrics Used for Path Calculation in Low Power and Lossy Networks," <draft-ietf-roll-routing-metrics-12>, Nov. 10, 2010 version.
Winter et al., "RPL: IPv6 Routing Protocol for Low Power and Lossy Networks," <draft-ietf-roll-rpl-15>, Nov. 11, 2010 version.

* cited by examiner

*Primary Examiner* — Minh-Trang Nguyen
(74) *Attorney, Agent, or Firm* — Edwards Wildman Palmer LLP; James M. Behmke; Stephen D. LeBarron

(57) ABSTRACT

In one embodiment, a wireless transmitting node in a frequency hopping wireless network may determine whether a packet can be transmitted within a particular timeslot of a frequency hopping sequence based on a length of the packet. If unable to transmit the packet within the particular timeslot, the transmitting node extends the particular timeslot into a subsequent timeslot to allow transmission of the packet within the extended timeslot at a frequency associated with the particular timeslot. Once the extended timeslot ends, the transmitting node and receiving node hop frequencies into the subsequent timeslot to synchronize with the rest of the network that already hopped at the conventional rate. In another embodiment, a wireless receiving node may also extend the particular timeslot into a subsequent timeslot to allow reception of a packet that would extend beyond the particular timeslot, and may hop frequencies upon expiration of the extended timeslot.

20 Claims, 14 Drawing Sheets

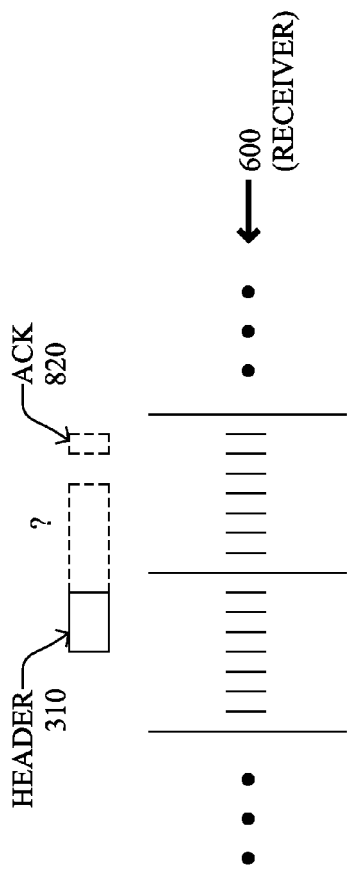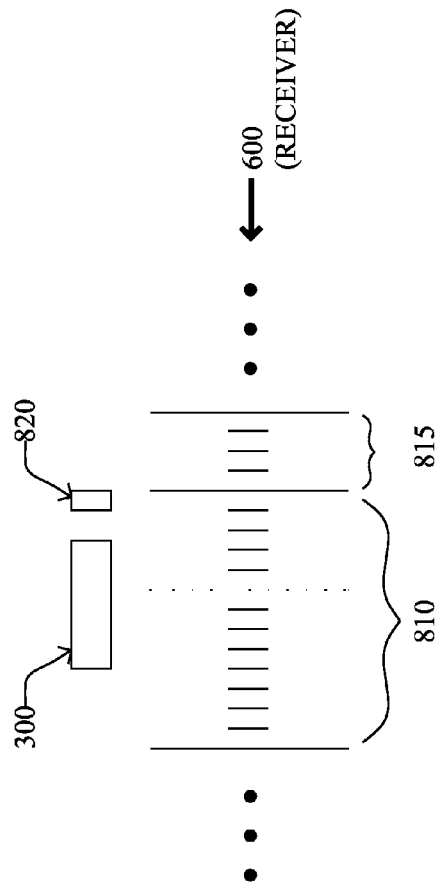

EXTENDABLE FREQUENCY HOPPING TIMESLOTS IN WIRELESS NETWORKS

TECHNICAL FIELD

The present disclosure relates generally to wireless communication, and, more particularly, to frequency hopping timeslots in wireless networks.

BACKGROUND

In frequency hopping wireless networks, time frames are divided into regular timeslots, each one operating on a different frequency. A reference clock may be provided for the time frames for an entire network (e.g., mesh/cell), and a media access control (MAC) layer of each node divides time into timeslots that are aligned with the timeslot boundary of its neighbor (e.g., parent node). Also, each timeslot may be further divided into sub-timeslots, e.g., 6, 8, or 12 sub-timeslots within a timeslot. Illustratively, the MAC layer is in charge of scheduling the timeslot in which a packet is sent, the main objective of which being randomization of the transmission time in order to avoid collisions with neighbors' packets.

That is, in order to minimize collisions between packets, the MAC layer randomizes the sub-timeslot in which it starts sending each packet. Given the fact that the length of data packets may vary according to the size of their payload, the randomization parameters need to be adjusted accordingly. As the size of the payload increases, however, the randomization window is decreased, consequently impairing the ability of the system to alleviate packet collision.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-B illustrate an example of an extended timeslot for receiving in the frequency hopping sequence;

DESCRIPTION OF EXAMPLE EMBODIMENTS

Overview

Figure 1:
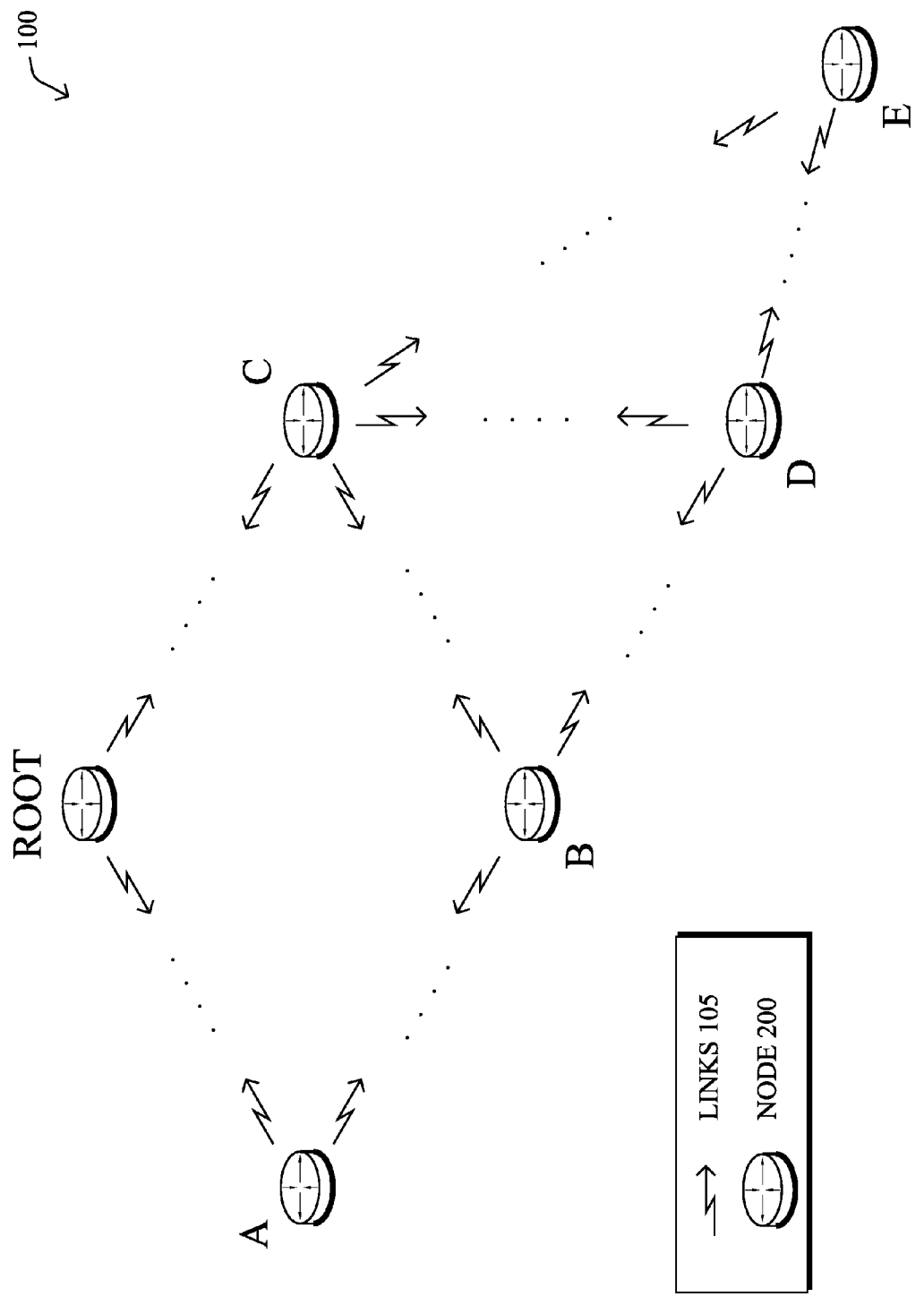
FIG. 1 illustrates an example wireless network.

According to one or more embodiments of the disclosure, a wireless transmitting node in a frequency hopping wireless network may determine whether a packet can be transmitted within a particular timeslot of a frequency hopping sequence based on a length of the packet. If unable to transmit the packet (e.g., and receive an acknowledgment) within the particular timeslot, the transmitting node extends the particular timeslot into a subsequent timeslot to allow transmission of the packet within the extended timeslot at a frequency associated with the particular timeslot. Once the extended timeslot ends, the transmitting node hops into the subsequent timeslot and adjusts its frequency accordingly (to catch up with the rest of the network that already hopped at the conventional rate).

According to one or more additional embodiments of the disclosure, a wireless receiving node may receive a header of a wireless packet that indicates at least a destination address and a length of the packet. If the packet is not destined for the receiving node, then the packet may be ignored. However, in response to the destination address corresponding to the receiving node, the receiving node determines whether the packet can be received within a particular timeslot of a frequency hopping sequence. If not, then the receiving node may extend the particular timeslot into a subsequent timeslot to allow reception of the packet within the extended timeslot at a frequency associated with the particular timeslot. Upon expiration of the extended timeslot (e.g., and after an acknowledgment transmitted during the extended timeslot), the receiving device hops into the subsequent timeslot and adjusts its frequency accordingly to synchronize with the rest of the network.

DESCRIPTION

A network is a geographically distributed collection of nodes interconnected by communication links and segments for transporting data between end nodes, such as personal computers and workstations, or other devices, such as radios, sensors, etc. Many types of computer networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC) and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities," and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example wireless network 100 (e.g., computer network, communication network, etc.) illustratively comprising nodes/devices 200 (e.g., labeled as shown, "ROOT" "A," "B," "C," "D," and "E") interconnected by wireless communication (links 105). In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices A-E may be utilized). Also, while the embodiments are shown herein with reference to a generally wireless network, the description herein is not so limited, and may be applied to networks that have wired and wireless links.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate. As described herein, the communication may be based on a frequency hopping protocol. In this context, a protocol consists of a set of rules defining how the nodes interact with each other.

Figure 2:
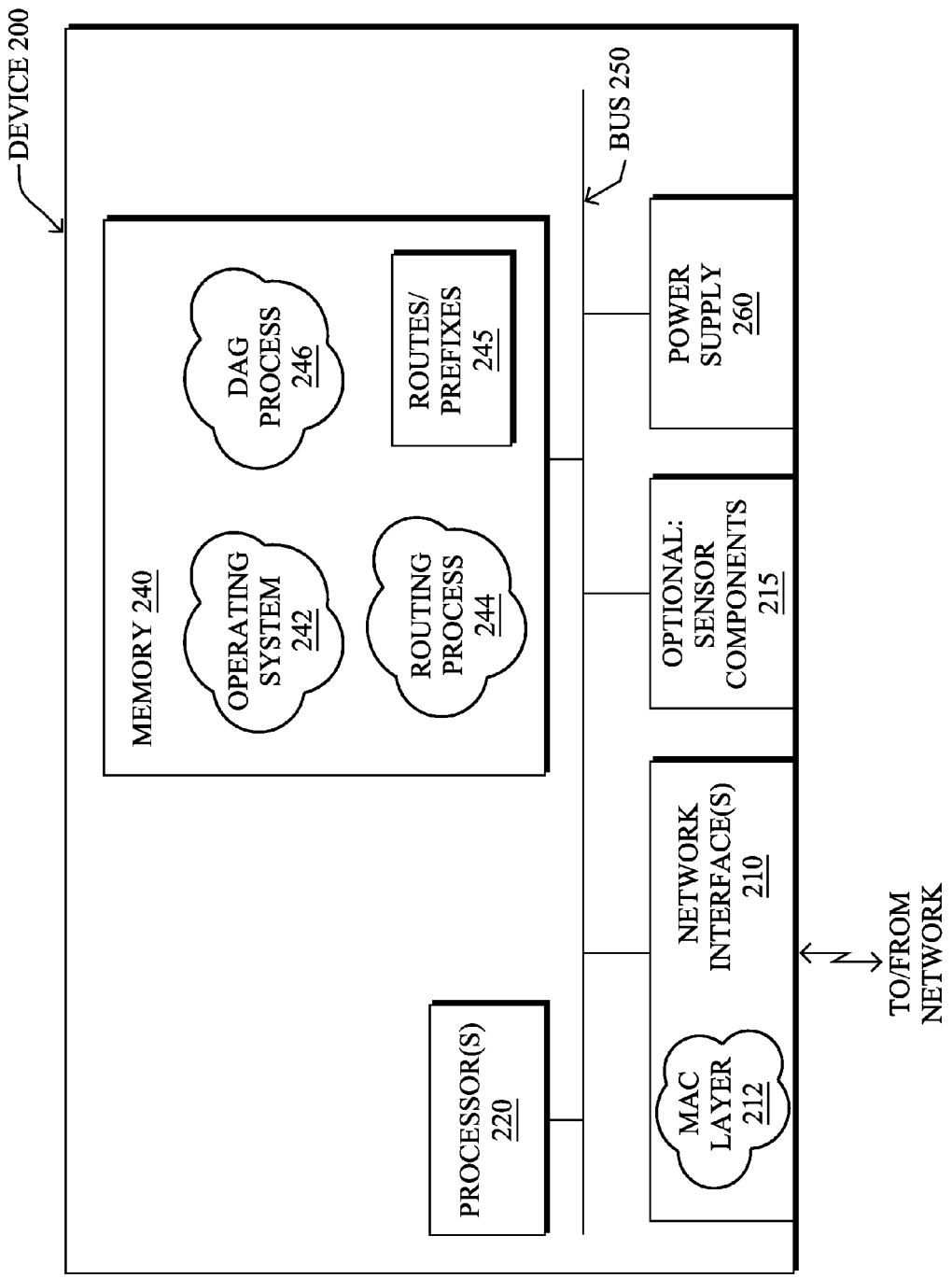
FIG. 2 illustrates an example wireless device/node.

FIG. 2 is a schematic block diagram of an example node/device 200 that may be used with one or more embodiments described herein, e.g., as nodes A-E and ROOT. The device may comprise one or more wireless network interfaces 210, an optional sensor component (e.g., for sensor network devices), at least one processor 220, and a memory 240 interconnected by a system bus 250, as well as a power supply 260 (e.g., to battery, plug-in, etc.).

The wireless network interface(s) 210 contain the mechanical, electrical, and signaling circuitry for communicating data over wireless links 105 coupled to the network 100. The network interfaces may be configured to transmit and/or receive data using a variety of different wireless communication protocols as noted above and as will be understood by those skilled in the art. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Figure 3:
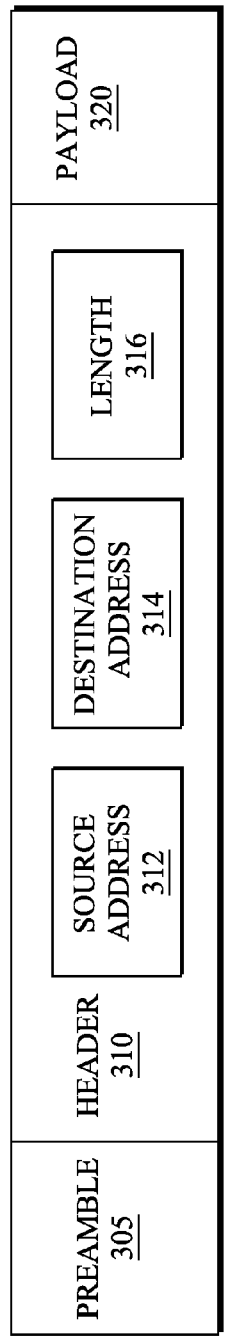
FIG. 3 illustrates an example wireless message/packet.

FIG. 3 illustrates an example simplified message/packet format 300 that may be used to communicate information between devices 200 in the network. For example, message 300 illustratively comprises a header 310 with one or more fields such as a source address 312, a destination address 314, and a length field 316, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In certain embodiments herein, the message payload 320 may comprise specific information that may be carried within one or more type-length-value (TLV) fields as described herein. In addition, based on certain wireless communication protocols, a preamble 305 may precede the message 300 in order to allow receiving devices to acquire the transmitted message, and synchronize to it, accordingly.

As mentioned above, Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF Internet Draft, entitled "RPL Objective Function 0"<draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 4:
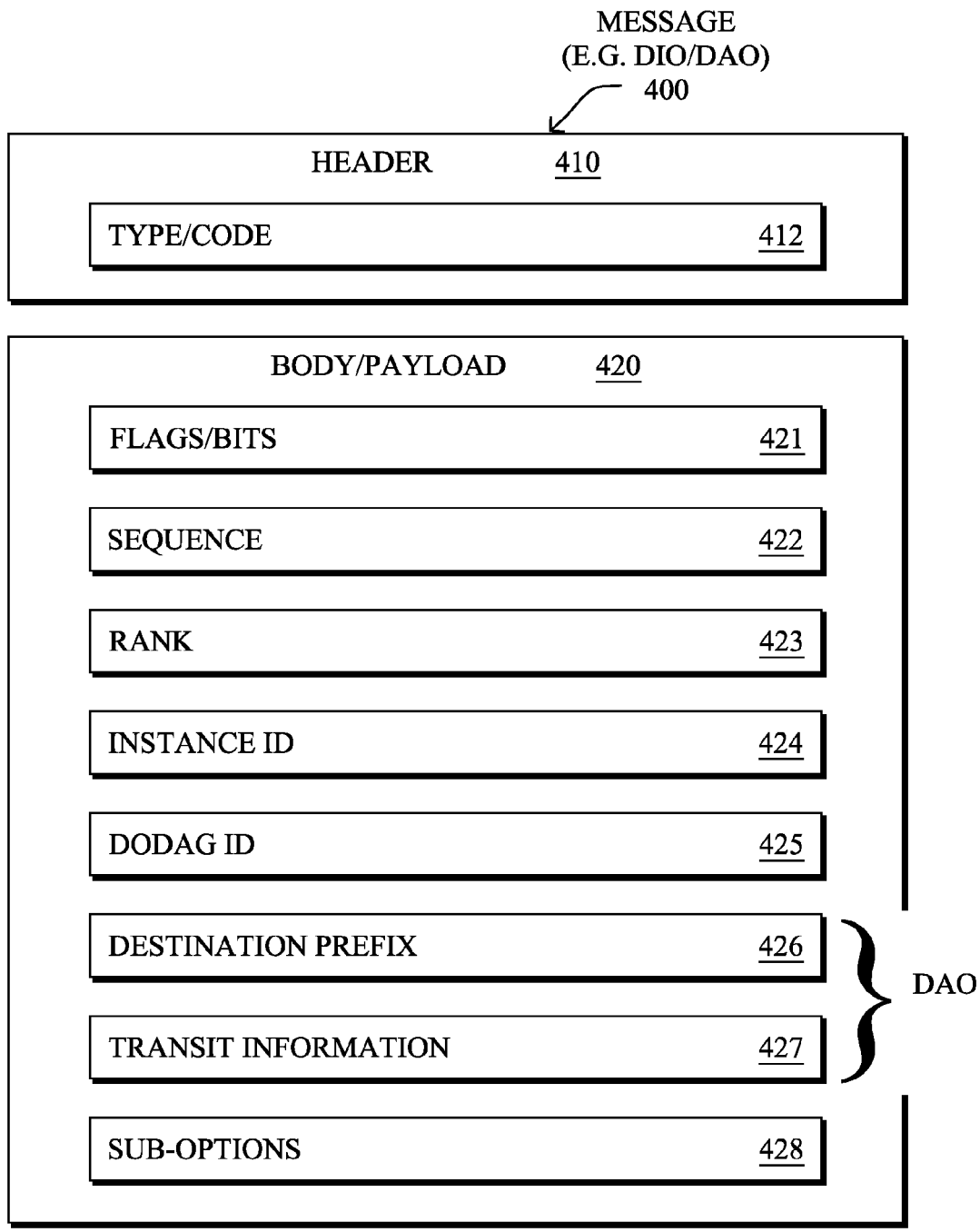
FIG. 4 illustrates an example topology management message.

FIG. 4 illustrates an example simplified control message format 400 that may be used for discovery and route dissemination when building a DAG, e.g., as a DIO or DAO. Message 400 illustratively comprises a header 410 with one or more fields 412 that identify the type of message (e.g., a RPL control message), and a specific code indicating the specific type of message, e.g., a DIO or a DAO (or a DAG Information Solicitation). Within the body/payload 420 of the message may be a plurality of fields used to relay the pertinent information. In particular, the fields may comprise various flags/bits 421, a sequence number 422, a rank value 423, an instance ID 424, a DODAG ID 425, and other fields, each as may be appreciated in more detail by those skilled in the art. Further, for DAO messages, additional fields for destination prefixes 426 and a transit information field 427 may also be included, among others (e.g., DAO Sequence used for ACKs, etc.). For either DIOs or DAOs, one or more additional sub-option fields 428 may be used to supply additional or custom information within the message 400. For instance, an objective code point (OCP) sub-option field may be used within a DIO to carry codes specifying a particular objective function (OF) to be used for building the associated DAG. Alternatively, sub-option fields 428 may be used to carry other certain information within a message 400, such as indications, requests, capabilities, lists, etc., as may be described herein, e.g., in one or more type-length-value (TLV) fields.

Figure 5:
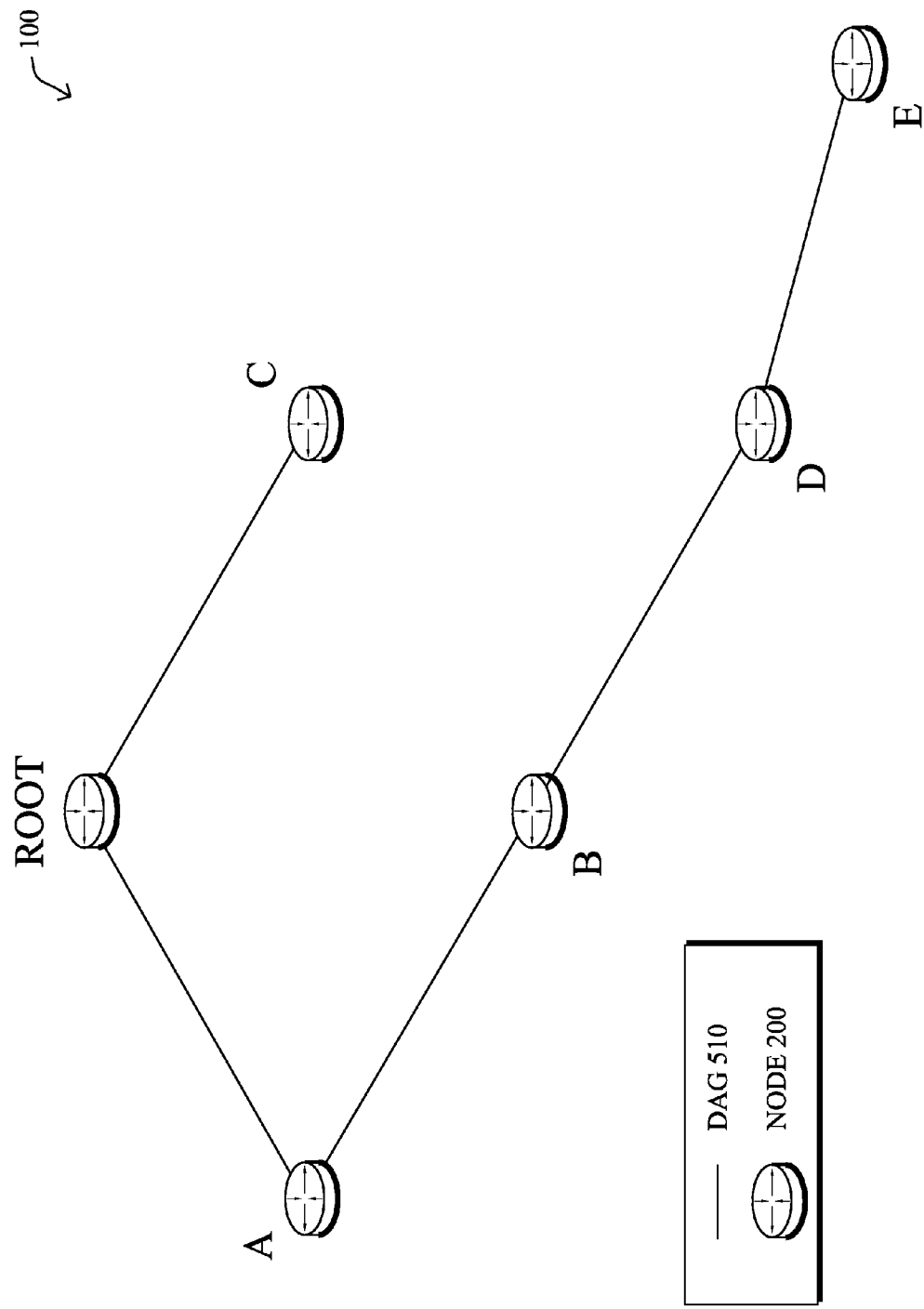
FIG. 5 illustrates an example directed acyclic graph (DAG) in the wireless network of FIG. 1.

FIG. 5 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 510 (shown as straight lines), which extends from the root node toward one or more leaf nodes (nodes without children). Traffic/packets 140 (shown in FIG. 1) may then traverse the DAG 510 in either the upward direction toward the root or downward toward the leaf nodes.

Frequency Hopping

Frequency hopping, also referred to as "frequency-hopping spread spectrum" (FHSS) is a method of transmitting radio signals by rapidly switching a carrier among numerous frequency channels, e.g., using a pseudorandom sequence known to both transmitter and receiver. For example, frequency hopping may be utilized as a multiple access method in the frequency-hopping code division multiple access (FH-CDMA) scheme. Generally, as may be appreciated by those skilled in the art, transmission using frequency hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 6:
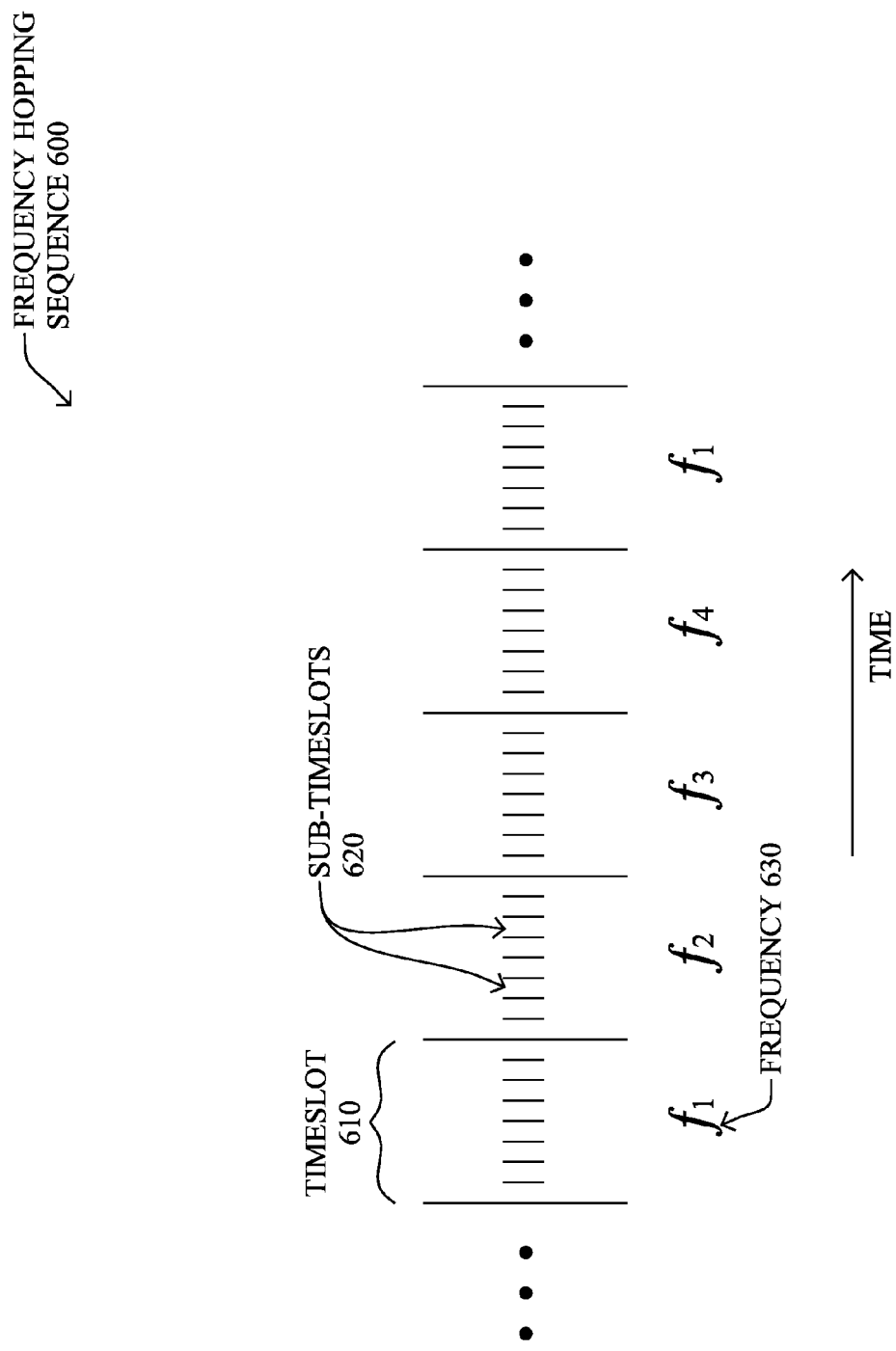
FIG. 6 illustrates an example frequency hopping sequence.

In particular, as noted above and as shown in FIG. 6, in frequency hopping wireless networks, time frames are divided within a frequency hopping sequence 600 into regular timeslots 610, each one operating on a different frequency 630 (e.g., $f_1$-$f_4$). A reference clock may be provided for the time frames for an entire network (e.g., mesh/cell), and a MAC layer 212 of each node 200 divides time into timeslots that are aligned with the timeslot boundary of its neighbor (e.g., a parent node). Also, each timeslot 610 may be further divided into sub-timeslots 620. Illustratively, the MAC layer 212 is in charge of scheduling the timeslot in which a packet is sent, the main objective of which being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

When a packet 300 is sent in a timeslot, depending on its size (length), the transmission may start at a different sub-timeslots, and the transmission of acknowledgements (ACKs) will be done as soon as possible after the reception of the message that triggered them (i.e., within the timeslot of the reception). That is, in order to minimize collisions between packets, the MAC layer randomizes the sub-timeslot in which it starts sending each packet. Given the fact that the length of data packets may vary according to the size of their payload, the randomization parameters need to be adjusted accordingly. For example, when the system uses eight (8) sub-timeslots, and the packet is of a size smaller than 1 sub-timeslot, the MAC layer may start transmission in sub-timeslot (STS) 0, 1, 2, 3, 4, 5, or 6, reserving sub-timeslot 7 for the acknowledgement message from the receiving node. However, as the size of the payload increases, the randomization window is decreased. For instance, when the packet size occupies 3 sub-timeslots, the MAC layer may start transmission of this packet in timeslots 0, 1, 2, 3, or 4, and not 5 (to leave room for the acknowledgement) or 6-7 since the packet would not fit within the timeslot. In other words, as the size of a packet increases, the randomization window decreases, consequently impairing the ability of the system to alleviate packet collision.

Existing frequency hopping systems use fixed timeslot duration. This results in the observation that the longer a packet is, the shorter is the randomization window which determines when packet transmission starts. At the limit when the packet occupies the whole length of a timeslot minus the length of one timeslot which is required for the acknowledgement message, the transmission of the packet must start at the beginning of STS 0. This in turn makes the packet susceptible to collision with packets which may be transmitted from any other neighboring nodes (or hidden nodes).

Extendable Frequency Hopping Timeslots

Techniques described herein introduce the notion of timeslots with extendable or "elastic" duration. For instance, as described below, when the Mac layer 212 receives a packet 300 (for transmission or during reception), it analyzes the packet's size and adjusts its timeslot length accordingly. For example, if a transmission time of a long packet of size TS is randomized to start at the last sub-timeslot 620, the MAC layer extends the time of the given timeslot to allow transmission of the entire packet in the same frequency (the frequency remains unchanged during the duration of the packet transmission). After the node completes transmitting the packet it may remain at the same frequency for a predetermined time to allow the receiving node to send an acknowledgement (ACK) over the same timeslot/channel/frequency before switching to the next timeslot.

In other words, according to one or more embodiments herein, the use of a distributed frequency hopping sequence 600 is maintained, but the boundaries are made elastic, thus allowing packets to start at any sub-timeslot. When the packet crosses a boundary into a next sequenced timeslot, as the rest of the network hops to a next frequency, the nodes in communication remain at the previous frequency until the communication is completed. These techniques notably reduce network susceptibility to packet collisions for large packets, especially such as those which occupy more than half of a timeslot.

Illustratively, the techniques described herein may be performed by hardware, software, and/or firmware, such as in accordance with MAC layer module 212, which may contain computer executable instructions executed by a processor (e.g., processor 22 or an independent processor within the network interface 210) to perform functions relating to the novel techniques described herein, such as, e.g., as part of a frequency hopping communication protocol. For example, the techniques herein may be treated as extensions to conventional wireless communication protocols, such as the 802.11 protocol, WiFi, etc., and as such, would be processed by similar components understood in the art that execute such protocols, accordingly.

Operationally, from the perspective of a transmitting node (e.g., node B), the MAC layer 212 may obtain a packet 300 to transmit, such as a packet from higher layers (e.g., application layers, routing layers, etc.) or else packets that are generated by the MAC layer itself, as noted above. The length of the packet 300 may be determined, e.g., based on length (or duration) field 316 from packet header 310, and then according to the techniques herein, the transmitting node, e.g., after randomly determining the sub-timeslot in which transmission should commence in systems that support it, may determine whether the packet 300 can be transmitted within a particular timeslot 610 of a frequency hopping sequence 600, e.g., a current timeslot or a next suitable timeslot for which transmission is planned.

Similar to existing frequency hopping networks as described above, the start of packet transmission may be randomizing within the particular timeslot 610, such as beginning at a specific sub-timeslot 620. Unlike existing systems, however, which reduce the randomization window size as the length of the packet increases, the techniques herein in one embodiment allow the use a constant randomization window regardless of the packet size.

Figure 7:
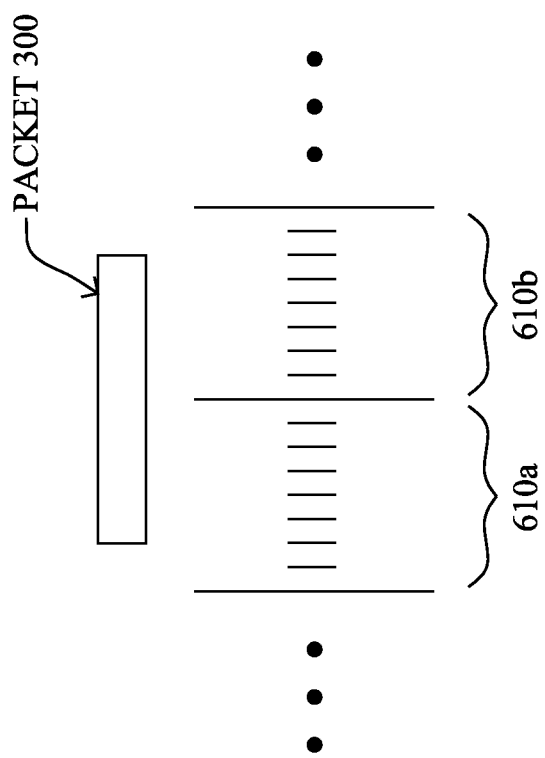
FIG. 7 illustrates an example packet timing within the frequency hopping sequence.

Since a long packet (e.g., the extreme length of a whole timeslot 610) starting later than the very first sub-timeslot 620 may start in one timeslot 610 and spill over to a next timeslot in the sequence. FIG. 7 illustrates an example randomized packet 300 that starts at a sub-timeslot other than the first sub-timeslot. As shown, the length of the packet 300, in combination with its start time in a particular timeslot 610*a*, may extend into the next timeslot 610*b*. Existing systems using timeslots of a fixed length (and operating at different frequencies in each timeslot) that were to experience this overlapping packet would refrain from sending the packet in the first timeslot as to avoid experiencing errors due to the change in channel frequency. In contrast, a system in accordance with the embodiments herein utilizes timeslots with extendable/elastic size.

Figure 8:
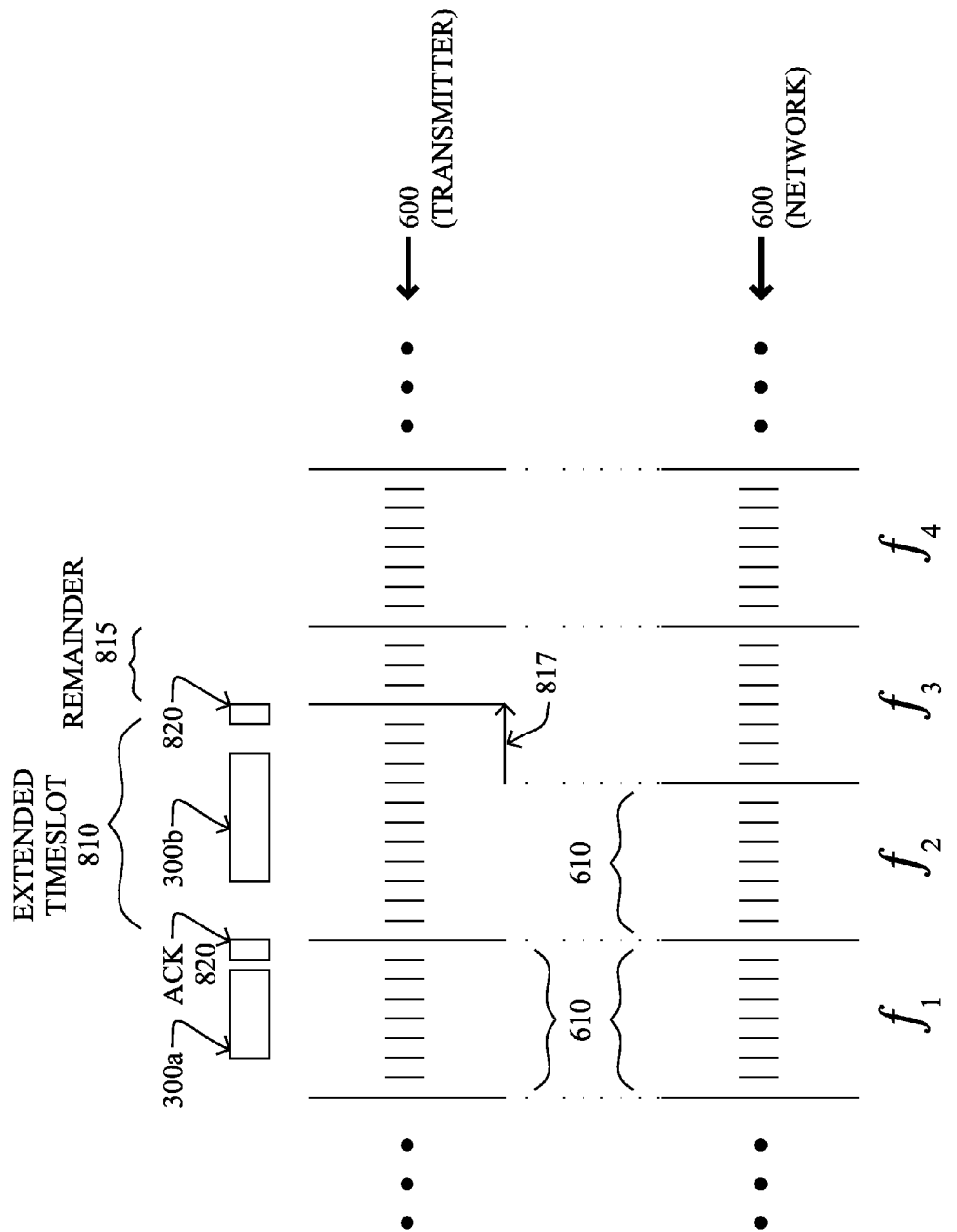
FIG. 8 illustrates an example of an extended timeslot for transmitting in the frequency hopping sequence.

As shown in FIG. 8, timeslots 610 of the frequency hopping sequence 600 may be lengthened into extended timeslots 810. Specifically, when a packet 300*a* can be sent within its rigid timeslot boundaries (e.g., including the time required for receiving an associated ACK message 820), the system behaves in a conventional manner to transmit the packet within the unextended timeslot 610, such that at the end of the fixed timeslot duration, the nodes hop to the next channel by moving their receiver and transmitter to the next frequency.

However, in response to not being able to transmit the packet 300*b* within the particular rigid timeslot, then the timeslot may be extended into a subsequent timeslot (or more where packets are longer than one timeslot in length). The extended timeslot 810 thus allows transmission of the packet within one (extended) timeslot without hopping frequencies, regardless of the start time of the packet. Note that where acknowledgments are used in the wireless communication protocol, the extended timeslot 810 may be lengthened to ensure that the extended time (817) accounts for allowing receipt of an acknowledgement (ACK) 820 from an intended receiver of the packet within the extended timeslot (ACKs are generally returned on the same frequency/timeslot as the transmitted packet).

The transmitting node may then proceed to transmit the packet 300*b* in the extended timeslot 810 at a frequency $f_2$ associated with the particular timeslot until the end of the extended timeslot. When the rest of the network jumps/hops to the next frequency $f_3$ at the end of the standard rigid timeslot, the transmitting node in the extended timeslot (and receiver, described below), remain in the current frequency $f_2$. Upon expiration of the extended timeslot 810, then, the transmitter and receiver may hop frequencies into the subsequent timeslot (frequency $f_3$). It should be noted that when this happens, the first timeslot is longer, and therefore the remainder 815 of the next timeslot for the transmitter (and receiver) is reduced.

From the receiving node's perspective (e.g., node A), when a header 310 of a packet 300 is received, notably before the whole packet has been received, the node (e.g., its MAC layer 212) analyzes the destination address 314 or other indication to determine whether the receiving node is the intended recipient of the packet 300. Illustratively, this analysis may occur after performing an error check on the header of the packet to ensure that the information is error free.

FIG. 9A illustrates receipt of a packet header 310 within a particular timeslot (e.g., at a particular sub-timeslot 620). If it is determined that the destination address corresponds to another wireless node (a decision indicated by the "?"), then the remainder of the packet (e.g., payload 320) may simply be ignored. In response to verifying that the receiving node is, in fact, the intended recipient node (e.g., that the destination address corresponds to the wireless node), then the receiving node determines, while the packet is still being received, whether the remainder of the packet 300 can be received within the same timeslot based on the length of the packet, e.g., by checking length field 316 (another decision also indicated by the "?"). If the MAC layer 212 of the receiving node determines that the length of the message is such that the reception of the message, e.g., and the processing of the ACK 820, can be accomplished within the current timeslot, then the packet may be received accordingly in that timeslot, and the channel/frequency switching occurs at the end of the timeslot in a conventional manner with the rest of the network.

However, in response to not being able to receive the packet within the particular timeslot, thus determining that the reception of the packet (and the associated sending of an ACK 820) may fall outside of the duration of the current (rigid) timeslot, the MAC layer extends the end of the duration of the current timeslot to ensure that the aforementioned operations can be accomplished within the duration of the current/extended timeslot 810. That is, as described above with respect to the transmitting node, the receiving node in this instance may extend the current timeslot into at least one subsequent timeslot to allow reception of the packet 300 within the extended timeslot, i.e., within a single timeslot without hopping frequencies mid-communication (thus at a frequency associated with the current timeslot). Also, where required, the receiving device may transmit an ACK 820 to an originator of the packet (e.g., transmitting node B) within the current timeslot (e.g., un-extended or extended) at the frequency associated with the timeslot in which the packet 300 was received. The receiver may then hop frequencies into the subsequent timeslot, as determined by the governing frequency hopping sequence, at expiration of the extended timeslot 810, similar to the transmitting node above (e.g., with a shorter remainder 815 of the next timeslot).

Notably, during the communication between the transmitting device (e.g., node B) and receiving device (e.g., node A), other nodes are generally unable to communicate with either device (node B or A), at least without interfering with (e.g., colliding with) the communication. Similarly, in existing systems other neighboring nodes (including hidden neighbors of the transmitting node B with respect to the receiving node A) may collide with the packet sent from node B to node A if they attempt to send a message during the transmission time of packet 300. In contrast, using the procedure of the embodiments herein, once the rest of the network hops to the next timeslot/frequency, though nodes may still be unable to communicate with the transmitter and receiver in extended timeslot communication, any attempts to communicate would not interfere with the ongoing communication, as it is on a different frequency. In this manner, network efficiency may be increased due to the potentially reduced occurrence of collisions during longer packet transmissions. In fact, it may be beneficial in one or more embodiments to specifically plan longer packet transmissions at the end of a given timeslot (e.g., nearer to a last sub-timeslot) in order to allow the longer packet to be transmitted, essentially, at a different frequency than the rest of the network.

According to one or more embodiments herein, a transmitting node may first determine whether an intended receiver supports extended timeslots, and then only if so may extend timeslots as described above. Illustratively, the ability of neighboring nodes to agree on the support of extendable/elastic timeslots may be exchanged through various capability advertisement mechanisms (messages 140) depending upon the underlying protocols used. For instance, according to one or more specific embodiments herein, the wireless nodes 200 of the network 100 may be participants in a DAG topology 510 as noted above. To this end, a new TLV may be defined that is carried within the DAG metric container itself (carried in the DIO message) that specifies the ability for a node to support extendable timeslots. Note that the TLC may also be added to the DAO message traveling upward for communication in the downward direction, so the parent can be aware of whether its child nodes can also support the extended timeslots as well.

Figure 10:
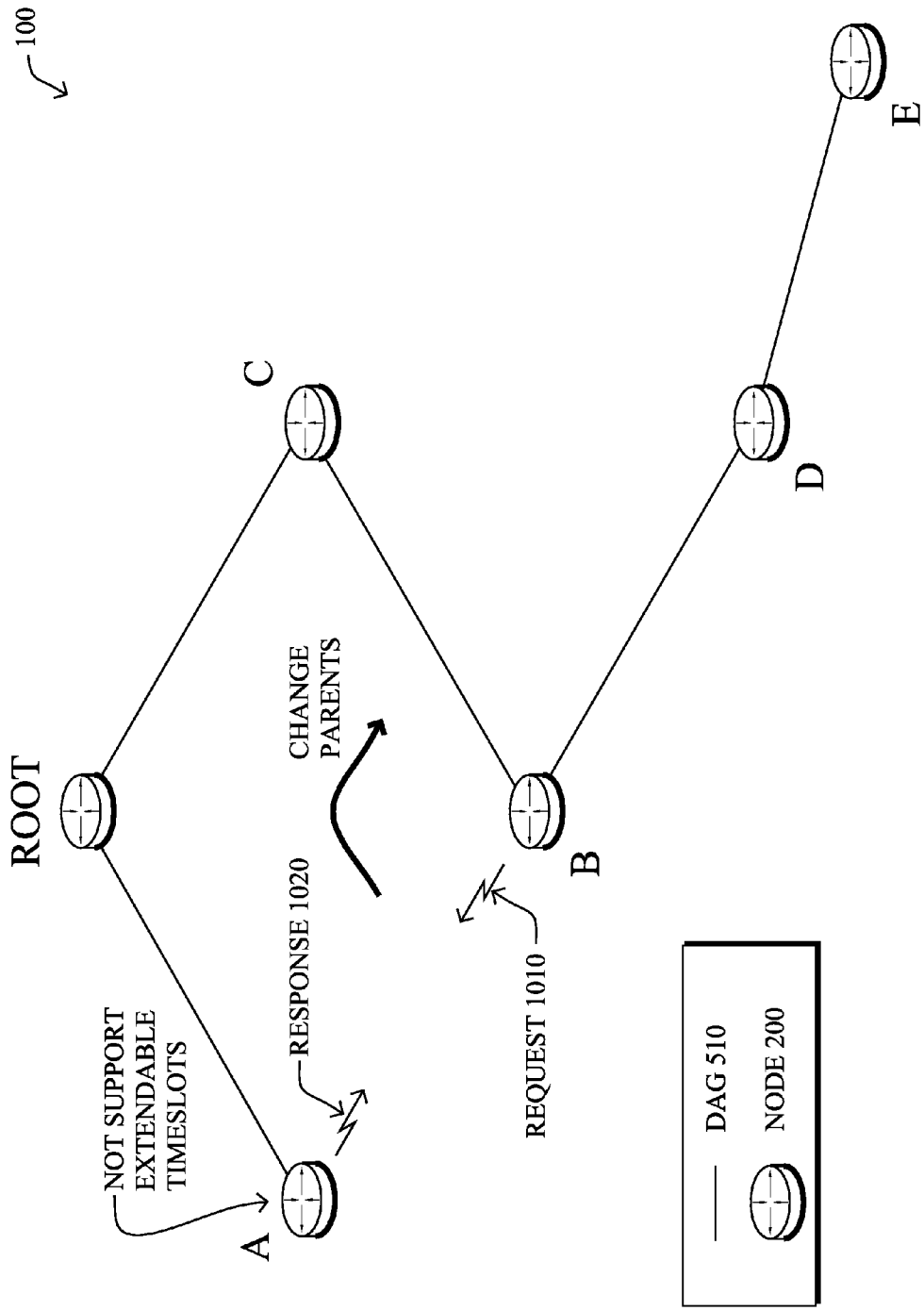
FIG. 10 illustrates an example topology change in the DAG of FIG. 4.

Note further that such capability can be used by the potential neighbors during the parent selection process within a DAG 510. In particular, as illustrated in FIG. 10, when a child (e.g., node B) decides to select a preferred parent, it may send a request 1010 to this node (e.g., node A) specifying the mode of operation (use of extendable timeslots). If the parent agrees to support that mode, no further message is required (other than an ACK), though one may be provided (response 1020). If the node does not support extendable timeslots, then a response 1020 may be sent back to the child indicating as such. The child may consider this response (rejection) when selecting parents, and consequently may select another preferred parent (e.g., node C as shown). Also, when a parent node (e.g., node A) determines that it has a child node (e.g., node B), the parent node may also send a request to determine whether the child supports extended timeslots (if not supported, the parent may, in certain embodiments, request that the child node choose another parent).

Figure 11A:
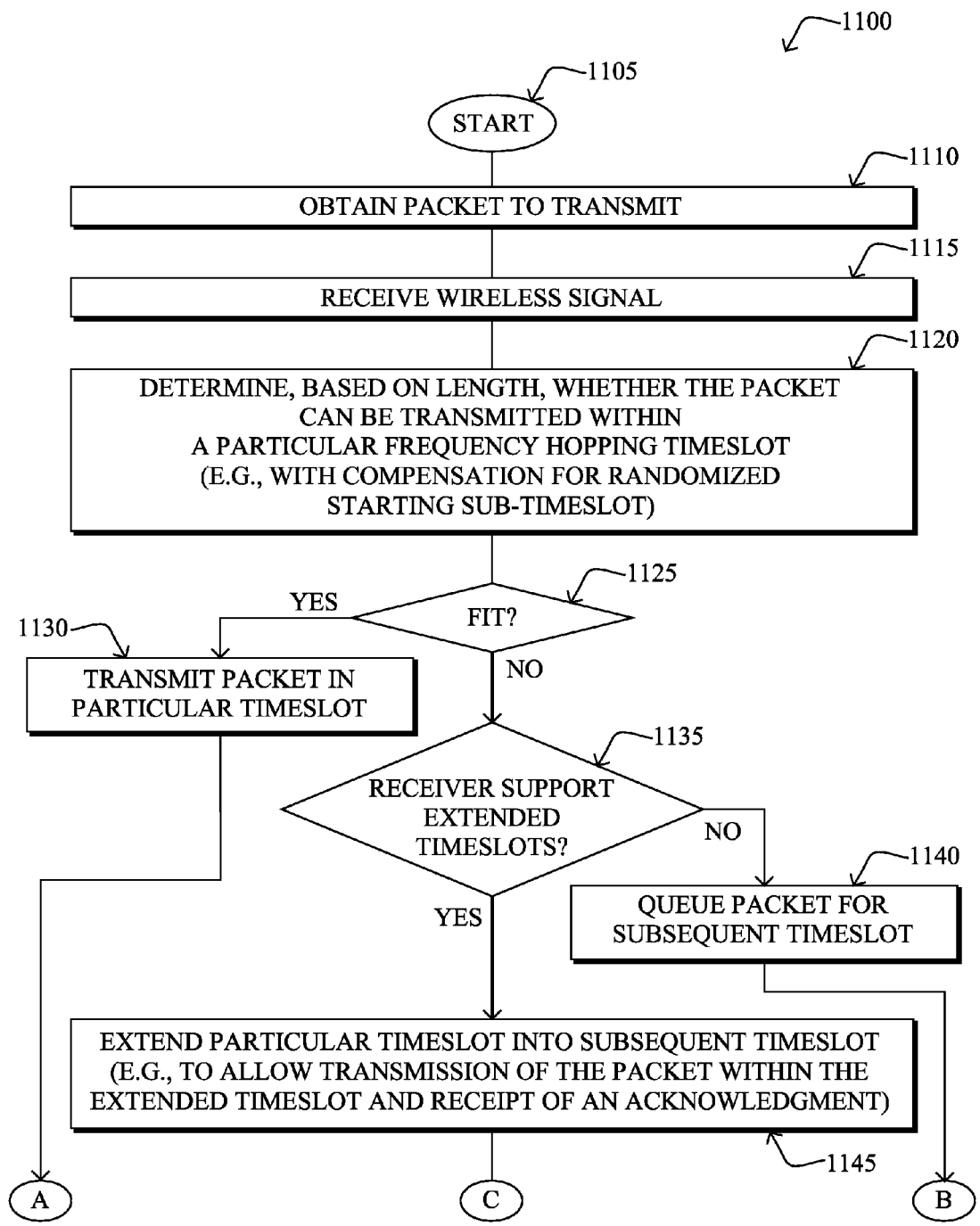
FIGS. 11A-B illustrate an example procedure for extendable frequency hopping timeslots in wireless networks from the perspective of a transmitting device.
Figure 11B:
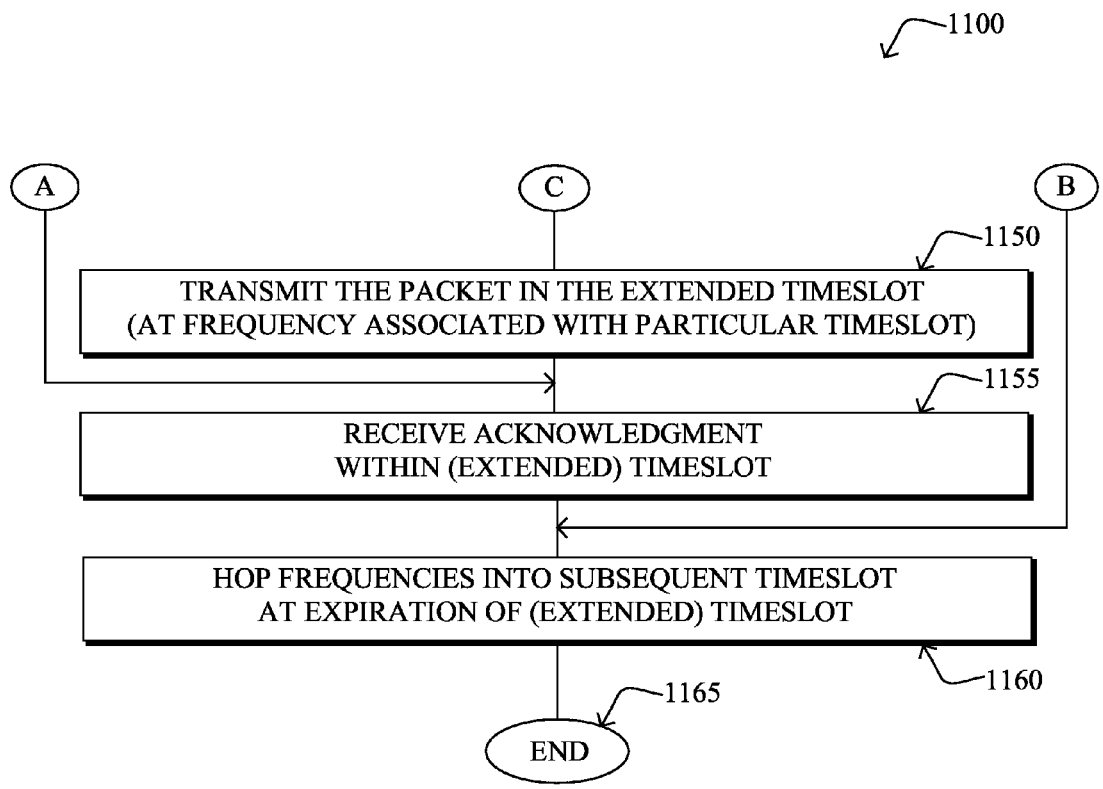

In closing, FIGS. 11A-B (transitioning at "A", "B", and "C") illustrate an example is simplified procedure for extendable frequency hopping timeslots in a wireless network in accordance with one or more embodiments described herein, e.g., from the perspective of a transmitting node (e.g., node B). The procedure 1100 starts at step 1105, and continues to step 1110, where the transmitting node, or more particularly, MAC layer 212 of the transmitting node, obtains a packet 300 to transmit. By determining the length of packet in step 1115, the transmitting nod may determine in step 1120 whether the packet can be transmitted within a particular (e.g., current rigid) frequency hopping timeslot 610 (e.g., with compensation for randomized starting sub-timeslot 620, as noted above). If the packet (including allocating time for ACK packet when indicated) would fit in the current/rigid timeslot in step 1125, then in step 1130 the packet may be transmitted in the particular timeslot, accordingly.

If, however, the packet would not fit in the particular rigid timeslot in step 1125, then in step 1135 the transmitting node may either proceed to step 1140 based on determining that a receiver (e.g., a parent node in DAG 410) doesn't support extended timeslots, and queues the packet for transmission in a subsequent timeslot. Else, if it is determined in step 1135 that extended timeslots are supported by the receiver, the system proceeds to step 1145. Specifically, in step 1145, the transmitting node may extend the particular timeslot into the subsequent timeslot in a manner that allows transmission of the packet (e.g., and receipt of an ACK 820) within the extended timeslot 810 as described in detail above. As such, the transmitting node may transmit the packet in the extended timeslot in step 1150, notably at the frequency 630 associated with particular timeslot.

Based on the transmitted packet 300 in steps 1130 or 1150 above, the transmitting device may receive an ACK within the corresponding (e.g., particular or extended) timeslot in step 1155. In step 1160, upon expiration of the timeslot (particular or extended timeslot), the transmitting device hops frequencies into a subsequent timeslot (e.g., into a remainder 815 of the subsequent timeslot when leaving an extended timeslot). The procedure 1100 then ends in step 1165, such that when another packet is obtained, the procedure 1100 may begin again at step 1105.

Figure 12A:
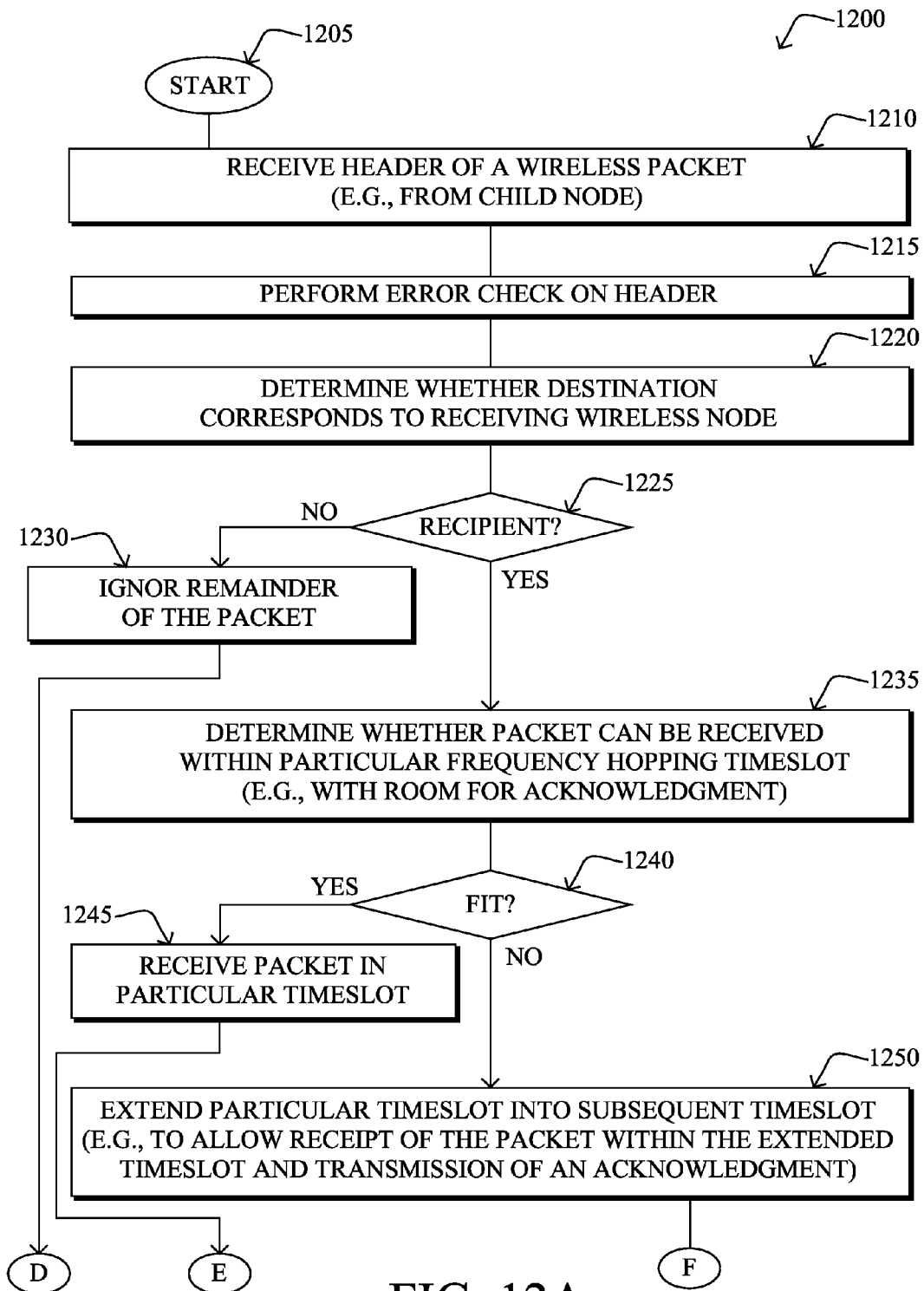
FIGS. 12A-B illustrate an example procedure for extendable frequency hopping timeslots in wireless networks from the perspective of a receiving device.
Figure 12B:
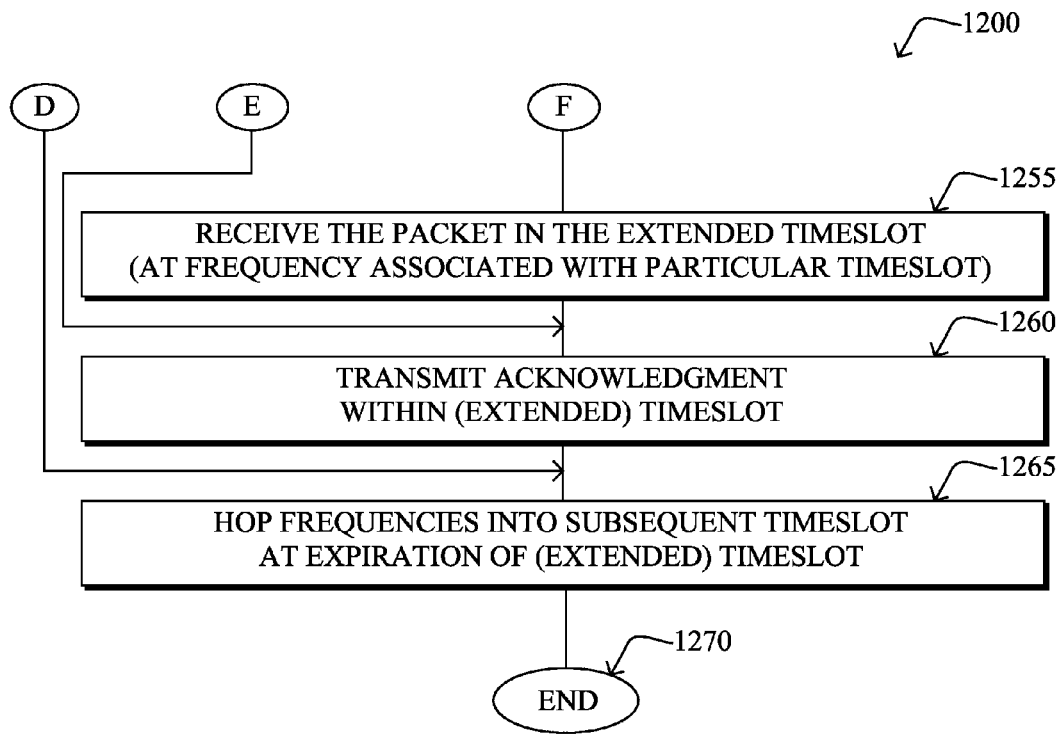

Additionally, FIGS. 12A-B (transitioning at "D", "E", and "F") illustrate an example simplified procedure for extendable frequency hopping timeslots in a wireless network in accordance with one or more embodiments described herein, e.g., from the perspective of a receiving node (e.g., A). The procedure 1200 starts at step 1205, and continues to step 1210, where a listening receiver node, or more particularly, MAC layer 212 of the receiving node, receives the header 310 of a packet 300 via a wireless transmission from a transmitting node (e.g., a child node within a DAG 410). After optionally performing an error check on the header in step 1215, the receiving node may determine in step 1220 whether the destination 314 of the packet corresponds to itself. If the node is not the recipient in step 1225, then in step 1230 the remainder of the packet may be ignored.

However, if the receiving node is the intended recipient in step 1225, then in step 1235 the node may also determine whether the received packet can be received within a particular frequency hopping timeslot based on a length 316 of the packet as determined from examination of the received header 310. Notably, as mentioned above, whether the packet fits in the particular (e.g., current) timeslot may also depend on whether there is room for a subsequent ACK 820. If, in step 1240, the packet would fit in the particular timeslot, then in step 1245 the packet may be received within the particular (e.g., current) timeslot.

Conversely, in the event that the packet would not fit in the particular/current timeslot in step 1240 based on the length 316 of the packet 300, then in step 1250 the receiving node may extend the particular timeslot into a subsequent timeslot. Illustratively, the extension may be based on also allowing receipt of the packet 300 within the extended timeslot and transmission of an ACK 820, accordingly. In step 1255, then, the receiving node may receive the packet in the extended timeslot 810, and at the frequency 630 associated with particular timeslot 610, as described above.

Upon receipt of a packet in step 1245 or 1255, the receiving node may transmit, in step 1260, an ACK 820 within the same timeslot as the received packet, i.e., the particular timeslot or extended timeslot, respectively. After sending the ACK (or after determining that the receiving node is not the recipient in step 1230), the receiving node may hop frequencies into the subsequent timeslot in step 1265 upon expiration of the current (e.g., particular or extended) timeslot. The procedure 1200 ends in step 1270, until receiving another packet header in step 1205.

The novel techniques described herein, therefore, provide extendable ("elastic") timeslots in a frequency hopping wireless network. By having the MAC layer of the sending and receiving nodes determine whether the process of sending a packet or receiving the packet (e.g., including sending and receiving an ACK) fits in a fixed rigid timeslot duration, the MAC layers of the sending and receiving nodes can extend their respective timeslots in order to accommodate the completion of the aforementioned processing. This extension of the timeslot duration ensures that the resulting system is able to equally randomize the transmission time of all packets regardless of their size or duration, thus reducing packet collisions.

Also, by keeping the sending and receiving nodes at the same frequency beyond the conventional rigid timeslot boundary, collisions with packets from neighboring nodes are eliminated in subsequent rigid timeslots since the neighbor nodes have hopped to the next channel/frequency. This feature further increases the reliability of packet delivery because during the extended time 817, new packet transmissions from neighboring nodes (including hidden neighbors) occur at a different frequency. Therefore these transmissions will not collide with the packet which is sent over the extended timeslot 817. Accordingly, the techniques herein also facilitate longer packets, which are allowed to start anywhere in the current timeslot, rather than waiting for the next timeslot. This is accomplished, moreover, without increasing collision rates, and as such can further increases the effective network efficiency (effective bandwidth) by reducing the overall delay through a mesh network (e.g., from sending packets earlier, rather than waiting for subsequent timeslots).

While there have been shown and described illustrative embodiments that provide extendable ("elastic") timeslots in a frequency hopping wireless network, it is to be understood that various other adaptations and modifications may be made within the spirit and scope of the embodiments herein. For example, the embodiments have been shown and described herein with relation to wireless networks, such as LLNs. However, the embodiments in their broader sense are not as limited, and may, in fact, be used with other types of networks and/or protocols where only certain nodes within the network communicate wirelessly. Also, while the description above relates to packets and packet headers, the techniques may be equally applicable to non-packetized transmissions where there is reason to maintain a determined length/duration of a transmission within a particular extended timeslot (i.e., at the same frequency) for a duration that would otherwise cross into a next timeslot.

Further, while one or more embodiments are shown above where the receiving node independently decides to extend the timeslots based on the packet length, one or more alternative embodiments may allow the transmitting node to provide an indication (e.g., flag within the header) that the transmitting node initiated transmission of the packet in a manner requiring an extended timeslot. As such, the processing at the receiving node may be reduced to merely examining the header (of a packet destined to the receiving node) for the indication.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, based on a length of a packet to transmit from a wireless node in a frequency hopping wireless network, whether transmission of the packet can be completed within a particular timeslot of a frequency hopping sequence; and
   in response to determining that the packet transmission cannot be completed within the particular timeslot:
   extending the particular timeslot into at least one subsequent timeslot sufficient to allow transmission of the packet to be completed within a combination of the particular timeslot and an extended timeslot;
   transmitting at least some of the packet in the extended timeslot at a first frequency associated with the particular timeslot; and
   changing from the first frequency to one or more second frequencies at some point after expiration of the extended timeslot.

2. The method as in claim 1, wherein extending the particular timeslot comprises:

defining the extended timeslot to include time to receive an acknowledgement (ACK) from an intended receiver of the packet before expiration of the extended timeslot.

3. The method as in claim 1, further comprising:
   randomizing a start of packet transmission within the particular timeslot,
   wherein determining whether the packet can be transmitted within the particular timeslot is based on the randomized start.

4. The method as in claim 3, wherein the randomized start is one of a plurality of sub-timeslots within the particular timeslot.

5. The method as in claim 1, further comprising:
   determining whether an intended receiver supports the extended timeslot; and
   in response to determining that support exists at the intended receiver for the extended timeslot, extending the particular timeslot.

6. The method as in claim 1, further comprising:
   selecting a parent in a directed acyclic graph (DAG) based on whether the parent supports extended timeslots.

7. An apparatus, comprising:
   one or more wireless network interfaces configured to communicate in a frequency hopping wireless network;
   a processor coupled to the wireless network interfaces and adapted to execute one or more processes; and
   a media access control (MAC) module coupled to the processor and the wireless network interfaces, the MAC module configured to:
   determine, based on a length of a packet to transmit from a wireless node in a frequency hopping wireless network, whether transmission of the packet can be completed within a particular timeslot of a frequency hopping sequence; and
   in response to determining that the packet transmission cannot be completed within the particular timeslot:
   extend the particular timeslot into at least one subsequent timeslot sufficient to allow transmission of the packet to be completed within a combination of the particular timeslot and an extended timeslot;
   transmit at least some of the packet in the extended timeslot at a first frequency associated with the particular timeslot; and
   change from the first frequency to one or more second frequencies at some point after expiration of the extended timeslot.

8. The apparatus as in claim 7, wherein the MAC module is further configured to define the extended timeslot to include time to receive an acknowledgement (ACK) from an intended receiver of the packet before expiration of the extended timeslot.

9. The apparatus as in claim 7, wherein the MAC module is further configured to:
   randomize a start of packet transmission within the particular timeslot, wherein the determination of whether the packet can be transmitted within the particular timeslot is based on the randomized start.

10. The apparatus as in claim 9, wherein the randomized start is one of a plurality of sub-timeslots within the particular timeslot.

11. The apparatus as in claim 7, wherein the MAC module is further configured to:
    determine whether an intended receiver supports the extended timeslot; and
    in response to determining that support exists at the intended receiver for the extended timeslot, extend the particular timeslot.

12. The apparatus as in claim 7, wherein the MAC module is further configured to:
    select a parent in a directed acyclic graph (DAG) based on whether the parent supports extended timeslots.

13. A method, comprising:
    receiving a header of a wireless packet at a wireless node in a frequency hopping wireless network, the header indicating a destination address and a length of the packet;
    in response to the destination address not corresponding to the wireless node, ignoring a remainder of the packet; and
    in response to the destination address corresponding to the wireless node:
    determining whether receipt of the packet can be completed within a particular timeslot of a frequency hopping sequence; and
    in response to determining that receipt of the packet cannot be completed within the particular timeslot:
    extending the particular timeslot into at least one subsequent timeslot sufficient to allow receipt of the packet to be completed within a combination of the particular timeslot and an extended timeslot;
    receiving at least some of the packet in the extended timeslot at a first frequency associated with the particular timeslot; and
    changing from the first frequency to one or more second frequencies at some point after expiration of the extended timeslot.

14. The method as in claim 13, further comprising:
    defining the extended timeslot to include time to transmit an acknowledgement (ACK) before expiration of the extended timeslot; and
    transmitting the ACK to an originator of the packet within the extended timeslot at the frequency associated with the particular timeslot in response to receiving the remainder of the packet.

15. The method as in claim 13, further comprising:
    performing an error check on the header of the packet prior to determining whether the destination address corresponds to the wireless node.

16. The method as in claim 13, further comprising:
    receiving, by the wireless node acting as a parent node in a directed acyclic graph (DAG), a request from a child node to determine whether the parent node supports extended timeslots; and
    responding to the child node that the parent node does support extended timeslots.

17. An apparatus, comprising:
    one or more wireless network interfaces configured to receive a header of a wireless packet in a frequency hopping wireless network, the header indicating a destination address and a length of the packet;
    a processor coupled to the wireless network interfaces and adapted to execute one or more processes; and
    a media access control (MAC) module coupled to the processor and the wireless network interfaces, the MAC module configured to:
    ignore a remainder of the packet in response to the destination address not corresponding to a wireless node; and
    in response to the destination address corresponding to the wireless node:
    determining whether receipt of the packet can be completed within a particular timeslot of a frequency hopping sequence; and
    in response to determining that receipt of the packet cannot be completed within the particular timeslot:

extending the particular timeslot into at least one subsequent timeslot sufficient to allow receipt of the packet to be completed within a combination of the particular timeslot and an extended timeslot;

receiving at least some of the packet in the extended timeslot at a first frequency associated with the particular timeslot; and changing from the first frequency to one or more second frequencies at some point after expiration of the extended timeslot.

18. The apparatus as in claim 17, wherein the MAC module is further configured to:

defining the extended timeslot to include time to receive an acknowledgement (ACK) from an intended receiver of the packet before expiration of the extended timeslot; and transmit the ACK to an originator of the packet within the extended timeslot at the frequency associated with the particular timeslot in response to receiving the remainder of the packet.

19. The apparatus as in claim 17, wherein the MAC module is further configured to:

perform an error check on the header of the packet prior to determining whether the destination address corresponds to the wireless node.

20. The apparatus as in claim 7, further comprising:

a memory configured to store a process, the process when executed operable to:

receive a request from a child node in a directed acyclic graph (DAG) to determine whether the apparatus as a parent node supports extended timeslots; and respond to the child node that the apparatus does support extended timeslots.

* * * * *

UNITED STATES PATENT AND TRADEMARK OFFICE
CERTIFICATE OF CORRECTION

PATENT NO. : 8,842,630 B2  
APPLICATION NO. : 12/971205  
DATED : September 23, 2014  
INVENTOR(S) : Shaffer et al.

Page 1 of 1

It is certified that error appears in the above-identified patent and that said Letters Patent is hereby corrected as shown below:

In the Specification

Please amend column 12, line 12 follows:
  "C") illustrate an example simplified procedure for extend- Signed and Sealed this
Twenty-fifth Day of August, 2015

Michelle K. Lee
*Director of the United States Patent and Trademark Office*